United States Patent
Fitzgerald et al.

(10) Patent No.: US 11,972,279 B2
(45) Date of Patent: Apr. 30, 2024

(54) SMART DEVICE CONFIGURATION GUIDANCE VIA AUTOMATED ASSISTANT INTERFACE OF SEPARATE CLIENT DEVICE

(71) Applicant: Google LLC, Mountain View, CA (US)

(72) Inventors: Alexandra Fitzgerald, Santa Clara, CA (US); Jesse Boettcher, San Jose, CA (US); Melissa Daniels, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 273 days.

(21) Appl. No.: 17/001,306

(22) Filed: Aug. 24, 2020

(65) Prior Publication Data

US 2020/0387391 A1  Dec. 10, 2020

Related U.S. Application Data

(63) Continuation of application No. 15/589,639, filed on May 8, 2017, now Pat. No. 10,754,673.

(51) Int. Cl.
*G06F 9/451* (2018.01)
*G06F 3/0484* (2022.01)
(Continued)

(52) U.S. Cl.
CPC .......... *G06F 9/453* (2018.02); *G06F 3/04895* (2013.01); *G06F 3/167* (2013.01);
(Continued)

(58) Field of Classification Search
CPC ...... G06F 9/453; G06F 3/04895; G06F 3/167; G06F 3/0484; G06F 8/61; G06F 9/4411;
(Continued)

(56) References Cited

U.S. PATENT DOCUMENTS 7,509,324 B2  3/2009  Burr et al.
7,533,339 B2  5/2009  Wadhwa
(Continued)

FOREIGN PATENT DOCUMENTS

EP   3010015      4/2016
WO   2016205213   12/2016

OTHER PUBLICATIONS

European Patent Office; International Search Report and Written Opinion of PCT Ser. No. PCT/US2018/031447; 23 pages; dated Sep. 27, 2018.

(Continued)

*Primary Examiner* — Rami R Okasha
(74) *Attorney, Agent, or Firm* — Gray Ice Higdon

(57) ABSTRACT

Methods, apparatus, and computer readable media are described for tailoring instructions for configuring a smart device based on feedback received from the smart device and/or based on feedback received from a device that is separate from the smart device. Some implementations additionally or alternatively relate to utilization of data corresponding to previous installations of similar smart devices to tailor provided instructions in order to mitigate the reoccurrence of past issues during configuration of smart devices. Some implementations additionally or alternatively relate to proactively suggesting and/or providing, to a user, guidance related to a smart device in response to determining the smart device is to be configured by the user and/or in response to determining a complete configuration of the smart device has not occurred.

14 Claims, 8 Drawing Sheets

(51) Int. Cl.
   *G06F 3/04895* (2022.01)
   *G06F 3/16* (2006.01)
   *G06F 8/61* (2018.01)
   *G06F 9/4401* (2018.01)
   *G06F 9/445* (2018.01)
   *G06F 11/30* (2006.01)
   *G06F 15/177* (2006.01)
   *G06F 16/332* (2019.01)
   *G06V 20/20* (2022.01)
   *H04L 41/0803* (2022.01)
   *H04L 67/01* (2022.01)

(52) U.S. Cl.
   CPC .............. *G06F 8/61* (2013.01); *G06F 9/4411* (2013.01); *G06F 11/3093* (2013.01); *G06F 15/177* (2013.01); *G06F 16/3326* (2019.01); *G06V 20/20* (2022.01); *H04L 41/0803* (2013.01); *G06F 3/0484* (2013.01); *G06F 9/44505* (2013.01); *H04L 67/01* (2022.05)

(58) Field of Classification Search
   CPC .............. G06F 9/44505; G06F 11/3093; G06F 15/177; G06F 16/3326; G06V 20/20; H04L 41/0803; H04L 67/01
   See application file for complete search history.

(56) References Cited

U.S. PATENT DOCUMENTS

| | | | |
|---|---|---|---|
| 8,161,386 B1 | 4/2012 | Mark | |
| 9,058,230 B1 | 6/2015 | van Rietschote et al. | |
| 9,202,383 B2 | 12/2015 | Curt et al. | |
| 9,286,397 B1 | 3/2016 | Suleman et al. | |
| 9,426,278 B2 | 8/2016 | Clark et al. | |
| 11,314,846 B1* | 4/2022 | Colin | G16H 40/40 |
| 2006/0224778 A1 | 10/2006 | Shah et al. | |
| 2007/0078628 A1 | 4/2007 | Virji et al. | |
| 2008/0148367 A1 | 6/2008 | Hilerio et al. | |
| 2008/0183852 A1* | 7/2008 | Pramer | G06Q 30/02 |
| | | | 709/227 |
| 2009/0007097 A1 | 1/2009 | Hinton et al. | |
| 2010/0174599 A1* | 7/2010 | Rosenblatt | G06Q 30/0641 |
| | | | 705/14.37 |
| 2013/0015968 A1 | 1/2013 | Hogg | |
| 2013/0087629 A1 | 4/2013 | Stefanski et al. | |
| 2013/0198762 A1* | 8/2013 | Thorpe | G06F 9/453 |
| | | | 719/318 |
| 2013/0204440 A1 | 8/2013 | Fadell et al. | |
| 2013/0241734 A1 | 9/2013 | Cohen et al. | |
| 2014/0063344 A1* | 3/2014 | Dureau | H04N 21/478 |
| | | | 348/552 |
| 2014/0101720 A1 | 4/2014 | Xie et al. | |
| 2014/0350733 A1* | 11/2014 | Lorenz | F24F 11/58 |
| | | | 700/276 |
| 2015/0053779 A1 | 2/2015 | Adamek et al. | |
| 2015/0053780 A1 | 2/2015 | Nelson et al. | |
| 2015/0095823 A1 | 4/2015 | Brewer et al. | |
| 2015/0097663 A1* | 4/2015 | Sloo | G01N 33/004 |
| | | | 340/501 |
| 2015/0144705 A1 | 5/2015 | Thiruvengada et al. | |
| 2015/0148963 A1 | 5/2015 | Klein et al. | |
| 2015/0154976 A1* | 6/2015 | Mutagi | G06F 3/167 |
| | | | 704/275 |
| 2015/0172262 A1 | 6/2015 | Ortiz et al. | |
| 2015/0199229 A1 | 7/2015 | Amendjian et al. | |
| 2015/0219357 A1 | 8/2015 | Stefanski et al. | |
| 2015/0254221 A1 | 9/2015 | Nigam et al. | |
| 2015/0319038 A1* | 11/2015 | Spencer | G06Q 10/06 |
| | | | 370/254 |
| 2015/0334165 A1 | 11/2015 | Arling et al. | |
| 2015/0348554 A1 | 12/2015 | Orr et al. | |
| 2015/0350806 A1 | 12/2015 | Britton et al. | |
| 2016/0004521 A1 | 1/2016 | Park et al. | |
| 2016/0062572 A1* | 3/2016 | Yang | H04W 4/80 |
| | | | 715/835 |
| 2016/0065653 A1* | 3/2016 | Chen | H04L 41/0813 |
| | | | 715/735 |
| 2016/0094598 A1* | 3/2016 | Gedikian | H04L 65/611 |
| | | | 455/456.3 |
| 2016/0127174 A1 | 5/2016 | Fu et al. | |
| 2016/0135025 A1 | 5/2016 | Bouzid et al. | |
| 2016/0170729 A1 | 6/2016 | Wang et al. | |
| 2016/0171486 A1* | 6/2016 | Wagner | G06Q 20/326 |
| | | | 705/39 |
| 2016/0182247 A1 | 6/2016 | Cregg | |
| 2016/0183030 A1 | 6/2016 | Cregg | |
| 2016/0210363 A1 | 7/2016 | Rambhia et al. | |
| 2016/0357422 A1 | 12/2016 | Milden et al. | |
| 2016/0372113 A1* | 12/2016 | David | G10L 15/22 |
| 2016/0380475 A1 | 12/2016 | Yang | |
| 2017/0005820 A1* | 1/2017 | Zimmerman | G05B 15/02 |
| 2017/0053112 A1 | 2/2017 | Shah et al. | |
| 2017/0118591 A1 | 4/2017 | Fournier et al. | |
| 2017/0126525 A1 | 5/2017 | Coates et al. | |
| 2017/0153879 A1* | 6/2017 | George | H04W 12/088 |
| 2017/0181254 A1 | 6/2017 | Meitl et al. | |
| 2017/0344609 A1 | 11/2017 | Wadley et al. | |
| 2018/0007140 A1 | 1/2018 | Brickell et al. | |
| 2018/0091506 A1 | 3/2018 | Chow et al. | |
| 2018/0137704 A1 | 5/2018 | Caterino et al. | |
| 2018/0183685 A1* | 6/2018 | Cook | H04W 4/08 |
| 2018/0189970 A1 | 7/2018 | Balasubramanian et al. | |
| 2018/0212773 A1* | 7/2018 | Kushnirsky | H04L 63/065 |
| 2018/0283716 A1 | 10/2018 | Ribbich et al. | |
| 2018/0301148 A1* | 10/2018 | Roman | H04W 4/70 |
| 2018/0302284 A1* | 10/2018 | Roman | H04L 41/0806 |
| 2018/0302285 A1* | 10/2018 | Roman | G06F 3/167 |

OTHER PUBLICATIONS

European Patent Office; Invitation to Pay Additional Fees in International Patent Application No. PCTUS2018031447 dated Aug. 1, 2018. 19 Pages.

China National Intellectual Property Administration; Notification of First Office Action issued in Application No. 201880030420.0; 19 pages; dated Nov. 30, 2022.

China National Intellectual Property Administration; Notification of Second Office Action issued for Application No. 201880030420.0, 6 pages, dated May 22, 2023.

European Patent Office; Communication pursuant to Article 94(3) EPC issued in Application No. 18729842.7; 6 pages; dated Jul. 6, 2023.

China National Intellectual Property Administration; Notification of Third Office Action issued in Application No. 201880030420.0; 15 pages; dated Aug. 31, 2023.

China National Intellectual Property Administration; Notice of Grant issued for Application No. 201880030420.0, 4 pages, dated Nov. 22, 2023.

* cited by examiner

SMART DEVICE CONFIGURATION GUIDANCE VIA AUTOMATED ASSISTANT INTERFACE OF SEPARATE CLIENT DEVICE

BACKGROUND

Automated assistants (also known as "personal assistant modules", "mobile assistants", or "chat bots") may be interacted with by a user via a variety of client devices, such as smart phones, tablet computers, wearable devices, automobile systems, standalone personal assistant devices, and so forth. The automated assistants receive input from the user (e.g., typed and/or spoken natural language input) and respond with responsive content (e.g., visual and/or audible natural language output). An automated assistant interacted with via a client device may be implemented via the client device itself and/or via one or more remote computing devices that are in network communication with the client device (e.g., computing device(s) in "the cloud"). Regardless of the implementation, interactions with the automated assistant can occur via an automated assistant interface, which can be a graphical and/or voice-based interface.

SUMMARY

Techniques are described herein for using an automated assistant to provide guidance in installing, or otherwise configuring, a smart device. The guidance can be provided via an automated assistant interface of client device(s) that are separate from the smart device, and can be adapted based on various factors, such as feedback generated by the smart device and/or feedback generated by other device(s) during the configuration.

Oftentimes upon purchasing a smart device, a user may attempt to install the smart device without assistance and/or by relying on a fixed set of provided instructions. As a result, a user may often install the smart device improperly, install the smart device in a sub-optimal location and/or with sub-optimal parameters, and/or encounter problems during installation. In order to address these and/or other issues, implementations described herein relate to utilizing an automated assistant interface to provide guidance to the user during installation of a smart device. In some implementations, the provided guidance can be dynamically adapted based on feedback received during the installation process. As described herein, the feedback can be generated by the smart device itself, can be image(s) captured via a client device (e.g., a client device providing the automated assistant interface, or a separate client device), and/or other forms of feedback. Furthermore, in some additional or alternative implementations, the automated assistant interface can allow the user to query the automated assistant for various purposes during the installation process, without requiring the user to transition away from the automated assistant interface being utilized to provide the guidance.

Various techniques may be utilized to determine that a smart device is to be installed by a user, and to initiate the providing of guidance via an automated assistant interface in response. In some implementations, such a determination may be made based on input that is an explicit self-initiated request of the user (e.g, "Assistant, help me install Smart Device X"). In some implementations, a suggestion to utilize the assistant interface for installation may be presented to the user based on one or more inputs, and the assistant interface may provide the guidance in response to an affirmative response to the suggestion (e.g., a selection of the suggestion). The suggestion may be provided via the automated assistant interface and/or a separate interface. In some of those implementations, the suggestion to install a smart device can be based on: detecting a signal generated by the smart device (e.g., a BLUETOOTH signal, RFID signal, wireless signal); determining that the user has recently purchased the smart device (e.g., based on an email purchase confirmation); based on captured image(s) that capture the smart device (e.g., an image captured by a camera of a client device that provides the automated assistant interface); based on detecting an issue during configuration of the smart device (e.g., an issue determined based on feedback from the hardware device); etc. As used herein, determining that a smart device is to be installed or otherwise configured by a user can occur prior to any configuration of the smart device by the user and/or can occur during configuration (but before the configuration is complete (as indicated by one or more criteria)). For example, determining that a smart device is to be configured can be based on input(s) received, from the smart device and/or the user, during the configuration of the smart device.

As one explicit example, the smart device can provide a temporary beacon signal for introducing itself to electronic device(s) in a home. A client device of the user can receive the beacon signal and, in response to receiving the beacon signal, can cause a suggestion for providing guidance to be provided. In other implementations, guidance may be provided via an automated assistant interface without first providing a suggestion. In some of those other implementations, the guidance can be provided in response to detecting a particular issue during configuration of the smart device. The particular issue can be detected based on feedback provided by the smart device and/or the guidance can be provided based on determining, from historical interactions of a plurality of users, that the particular issue is one for which users often seek guidance and/or is one that causes problem(s) during configuration. For example, based on historical interactions it can be determined that when installing Smart Device A, users often forget to perform Step X at a certain state of the installation process. In response to determining a user is at the certain state of the installation process (e.g., based on feedback from Smart Device A), an automated assistant interface can be utilized to proactively present Step X to the user, even if the user had not previously engaged the automated assistant during the installation process. For instance, the automated assistant interface can be utilized to provide graphical and/or spoken output of: "Hi, it looks like you are installing Smart Device A. Make sure you perform Step X next. Users often forget to perform Step X and it can cause issues if not performed."

Regardless of the technique(s) utilized to initiate the providing of guidance via an automated assistant interface, the automated assistant interface can be utilized to provide one or more steps in the installation process. The step(s) initially provided can be the "first steps" or could be downstream steps based on determining that installation has already progressed beyond the "first steps". Determining that installation has progressed beyond the "first steps" can be based on user interface input from the user (e.g., "I've plugged in Smart Device, can you help me with the rest?"), feedback from the smart device (e.g., that indicates a current configuration state), machine learning (e.g., based on machine learning models trained based on data from past installations of the same or similar smart device), etc.

In some implementations, during installation of the smart device, the smart device can cause feedback to be provided to the automated assistant and that feedback can be used to dynamically adapt the providing of guidance via the automated assistant interface. For example, already provided instructions via the automated assistant interface can correspond to steps for connecting wires of the smart device to wires of the home. If the user connects the wires incorrectly, the smart device can provide feedback to the automated assistant regarding the incorrect connection. Based on the feedback, adapted instructions can be provided via the automated assistant interface for disconnecting the wires and reconnecting the wires correctly. As another example, the smart device can include sensor(s) to determine an installation orientation of the smart device (e.g., "horizontally" on a ceiling or "vertically" on a wall), and provide such installation orientation to the automated assistant. Based on the installation orientation, appropriate further instructions may then be provided (e.g., selection between "horizontal installation" instruction(s) and "vertical installation" instruction(s)). Although the automated assistant interface is provided (audibly and/or graphically) by a client device of the user, the automated assistant itself may be implemented locally and/or remotely from the client device. Accordingly, providing feedback to the automated assistant may include: transmitting feedback to the client device (which may process it locally and/or optionally transmit it remotely to remote devices(s) that implement all or aspects of the automated assistant) and/or transmitting the feedback to remote device(s) that implement all or aspects of the automated assistant.

In some implementations, the automated assistant can identify a client device and/or an application on a client device capable of assisting the user with the installation of the smart device. The automated assistant can then adapt the installation instructions according to the client device and/or application that was identified. The client device can be the same client device that is providing the automated assistant interface, or an additional client device. For example, the automated assistant can access account data associated with the user and determine that the user owns a cellular device with a camera application installed on the cellular device. The automated assistant can then adapt the installation instructions to incorporate use of the camera application.

As one particular example, the assistant interface can be utilized to prompt the user to capture an image of wiring to be coupled to a smart device. The captured image can be analyzed to determine a particular configuration of the wiring, and further guidance provided via the automated assistant interface adapted to the particular configuration. For example, the captured image can be analyzed to determine a quantity of wires and colors of the wires, and a configuration selected that corresponds to the quantity and color. Further, additional instructions can then be provided that are particularized to the selected configuration. As another particular example, the assistant interface can be utilized to prompt the user to capture an image of an installation area for the smart device. The captured image can be analyzed to: determine whether the installation area is appropriate and/or to identify, from the installation area, one or more ideal locations for the installation. Further automated assistant interface provided guidance can then be adapted appropriately. For instance, if the smart device is a smoke detector, the image can be analyzed to identify a location that is at least a threshold distance from door(s), certain appliances (e.g., an oven), etc.—and that location conveyed to the user via the interface (e.g., via presentation of the captured image with an annotation of the location). As yet another particular example, the guidance provided via the automated assistant interface can be dependent on a model of the smart device—and the user may be prompted to capture an image of the smart device that enables discernment of the model (e.g., an image that captures a QR code, serial number, shape, and/or other features that enable discernment). Further provided guidance can then be adapted based on the model of the smart device.

In implementations where images or other content is captured and utilized to determine characteristic(s) for adapting provided guidance, the characteristics can optionally be determined based on applying the content to a trained machine learning model. For example, the trained machine learning model can be trained to accept an image as input and to generate, based on the applied input, output that indicates the characteristic(s). For instance, a machine learning model can be trained to determine wiring characteristics based on a training instances that each include an image of wiring (training example input) and labeled characteristics of the wiring (training example output).

In some implementations, the automated assistant can determine that multiple smart devices can work together to perform some function(s), and provide recommendations and/or guidance regarding configuring those devices to work together. In some of those implementations, the client device can employ a packet sniffing or packet analyzing application that can identify the multiple smart devices on a network to which the client device is connected. In some of those implementations, the client device can additionally or alternatively be connected to a router that can provide information to the client device for identifying the multiple smart devices on the network. In some of those implementations, multiple smart devices can additionally or alternatively be determined based on them all being associated with an account of the user and/or otherwise being associated with the user. In some of those implementations, multiple smart devices can additionally or alternatively be determined based on communications from the multiple smart devices over one or more communications channels and/or utilizing one or more communications protocols such as WIRELESS INTERCONNECT, WEAVE, and/or BTLE. Such communications channels and/or communications protocols may optionally not utilize router(s). For example, a mesh network may be utilized. Communications from multiple smart devices can be utilized by the client device, and/or other device(s) (e.g., remote device(s) in the "cloud") to identify the multiple smart devices.

The automated assistant can then provide suggestions and/or guidance to the user for enabling the smart devices to interact with one another. For example, a home lighting device can be connected on the network and include a motion sensor for providing feedback to the home lighting device. The home lighting device can be identified and it can be determined that the home lighting device can be used with installation and/or operation of a thermostat device. For instance, once the automated assistant determines that the user is wanting to install the thermostat device, the automated assistant can access installation instructions for installing the thermostat device. The automated assistant can then determine whether there are any available devices for assisting with the installation process. If the automated assistant identifies the home lighting device on the network, the automated assistant can adapt the installation instructions to include the home lighting device in one or more of the steps. For example, the thermostat can include a feature that allows the thermostat to keep track of the occupancy of a home. In order to bolster this functionality, the thermostat can use data from the motion sensor of the home lighting device to determine more accurate measurements of occupancy. During installation of the thermostat device, the automated assistant can ask the user to trigger the motion sensor of the home lighting device in order to test communications between the thermostat device and the home lighting device. By adapting the installation instructions in this way, the automated assistant can include steps that might otherwise be unknown to the user and/or be an afterthought to the user.

During installation of the smart device, should the user have any questions, the user can query the automated assistant for additional information without interrupting the installation process. For example, the user may be curious about a certain function of the smart device during the installation of the smart device. For instance, if the smart device is a security camera, the user can ask the automated assistant about whether the security camera can be setup to turn on and off according to the occupancy of room being observed by the security camera. The automated assistant can access one or more resources (e.g., a search system) to find information related to the query of the user and provide the information to the user during the installation. The information can be provided via the automated assistant interface, without requiring the user to engage a separate application. This can prevent disengagement from the installation process. Further, the state of the installation process can be stored and, upon completion of providing information regarding the query, the automated assistant interface can return to the state to continue the installation process where it was left off. In some implementations, if the query corresponds to a feature that can be configured during the installation, the automated assistant can ask the user if they would like assistance configuring the feature during installation. If the user agrees to receiving assistance to configuring the feature, the automated assistant can adapt the installation instructions to provide steps for configuring up the feature (e.g., programming the security camera to turn on and off according to the occupancy of a room in order to provide a sense of privacy during social gatherings).

In some implementations, a user can submit a query to the automated assistant during configuration of a smart device, and in generating a response to the query, the automated assistant can utilize the query and context information that is based on the smart device. As one example, assume the automated assistant has determined the user is configuring a smart device (e.g., based on captured image(s) and/or feedback from the smart device). Further assume the user has yet to utilize the automated assistant in the configuration, then submits (e.g., speaks or types) a query of "where do I put the blue wire". The automated assistant can generate a response to the query based on the query itself, and based on smart device context information. For instance, if the smart device is an Acme thermostat, the smart device context information can be "acme thermostat" and the automated assistant can generate a response based on modifying the query to include the smart device context information (e.g., submitting a query of "where do I put the blue wire in installing the acme thermostat?"). As another example, assume the automated assistant has determined the user is installing the Acme thermostat and determined the user is at State F of the installation process (e.g., based on feedback from the smart device and/or user interactions with the automated assistant itself). Further assume the user submits a query of "what button do I press". The query can be submitted before the user has otherwise utilized the automated assistant in the installation, or during utilization of the automated assistant in the installation. The automated assistant can generate a response to the query based on the query itself, and based on the smart device context information. For instance, the automated assistant can generate a response based on modifying the query to include an identifier of the Acme thermostat and/or information about the state. For instance, the modified query can be "what button do you press in State F of installing Acme thermostat?". In these and other manners, automated assistant responses to user queries can be generated in view of smart device context information, even in situations where the user has not, prior to the query, engaged the automated assistant in configuring the smart device.

In some situations, a user may begin configuring a smart device utilizing an automated assistant interface, but not perform a complete configuration using that interface. In some implementations, such failure to perform the complete configuration utilizing the automated assistant interface may be determined, and monitoring may occur to determine whether the complete configuration occurred independent of interaction with the automated assistant interface. For example, if the smart device isn't registered in an account of the user, detected on a network, and/or otherwise detected as "active" within a threshold amount of time—it can be determined that a complete configuration was not completed. In response to determining the complete configuration was not completed independently, user interface output may be provided for continuing the configuration of the smart device. For example, the further user interface output may be provided via the automated assistant interface and/or another interface and, if responded to affirmatively by the user, guidance related to continuing the configuration may be provided via the automated assistant interface (e.g., picking up where the user left off in the interface—or picking up elsewhere based on determining configuration progressed independent of the interface).

In yet other implementations, the installation instructions for a smart device can be adapted based on data obtained during previous installations of other smart devices by other users. For example, the adapted installation instructions can be based on how frequently users ask for assistance during certain steps of the installation process. For instance, if following the provision of instruction C of the installation process, users frequently ask "What is [thing]", instruction C can be modified, for future installations, to include an explanation of "What is [thing]" (e.g., to include "By the way, [thing] is . . . "). As another example, the adapted installation instructions can additionally or alternatively be based on images collected during previous installations. As yet another example, the adapted installation instructions can be provided based on location and/or other attributes of users. For instance, users in certain geographic regions can have similar home wiring arrangements that can cause issues during execution of the original installation instructions of the smart device. An example issue can be how to properly ground the smart device using the home wiring arrangement. Based on detecting this issue among a large quantity of past installations in the certain geographic region, the automated assistant can, for a user in the certain geographic region, adapt installation instructions to address the grounding issue—instead of providing the original installation instructions that did not adequately address the grounding issue. As yet another example, search queries and/or other interactions, that may optionally occur outside of the installation context, can be utilized to determine adaptations of installation instructions. For instance, based on a large quantity of search queries of "can I install Smart Device A on the wall?", installation instructions for Smart Device A can be adapted to inform the user of the advisability of mounting such device on a wall. In these and other manners, identified problems from prior installations can be utilized to adapt instructions provided in future installations—and such problems and/or adaptation can be specific to various user attributes.

In some implementations, should a user setup their home to include multiple connected devices and thereafter change residences, the automated assistant can help the user to re-install their devices in a new home. The automated assistant can detect that the user has moved the client device to a new home based on the release of the client device from one network and the connection of the client device in a new network. Once on the new network, the automated assistant can provide instructions to the user regarding connecting their devices in their new home, assigning devices to rooms in the new home, establishing schedules of operation based on schedules from the previous home, and/or identifying devices in the new home that were not previously connected to the client device. Furthermore, any devices (e.g., an appliance) that were left in the former residence by the user can be decommissioned by the automated assistant to be no longer associated with the account of the user. In this way, a new user can make use of the device in the new residence without requiring account information from the former user of the device.

In some implementations, a method performed by one or more processors is provided and includes determining, based on received input, that a smart device is to be configured by a user. The method further includes, based on determining that the smart device is to be configured by the user, providing, via an automated assistant interface of a client device of the user, one or more initial instructions for configuring the smart device. The client device is separate from the smart device. The method further includes, subsequent to providing the initial instructions, receiving a hardware feedback communication generated by the smart device. The method further includes, in response to receiving the hardware feedback communication, determining one or more further instructions for configuring the smart device. The further instructions are tailored to the hardware feedback communication and are determined based on the hardware feedback communication. The method further includes providing the determined further instructions via the automated assistant interface of the client device.

These and other implementations of technology disclosed herein may optionally include one or more of the following features.

In some implementations, the hardware feedback communication is generated by the smart device in response to physical interaction with the smart device by the user. In some of the physical interaction implementations, the physical interaction with the smart device by the user is connection of at least one wire to the smart device. In some versions of those implementations, the hardware feedback communication is generated by the smart device based on a detected property of the connection. In some of the physical interaction implementations, the hardware feedback communication is generated based on sensor data generated by one or more sensors of the smart device. In some versions of those implementations, the physical interaction is coupling of the smart device to an installation structure or to a power source. In some of the physical interaction implementations, the hardware feedback communication is transmitted by the smart device to the client device via one or more communication channels. In some versions of those implementations, the hardware feedback communication is transmitted by the smart device to the client device via a router in communication with the smart device and the client device.

In some implementations, the method further includes: receiving unsolicited user interface input provided by the user via the automated assistant interface; submitting, to a search system, a search that is based on the unsolicited user interface input; and providing, via the automated assistant interface, further user interface output that is based on responsive content returned by the search system in response to submitting the search. In some versions of those implementations, the method further includes: storing a state of the configuring the smart device at a time the unsolicited user interface input was received; and subsequent to generating the further user interface output, providing additional user interface output via the automated assistant interface, where the additional user interface output is provided based on the stored state.

In some implementations, determining the further instructions for configuring the smart device includes accessing a stored historical model. The historical model is generated based on other hardware feedback associated with previous user installations of similar smart devices, and the further instructions are tailored based on the historical model.

In some implementations, the received input is a verbal or textual input provided by the user to the automated assistant interface of the client device. In some implementations, the method further includes: providing, at the automated assistant interface of the client device, an assistant output based on user data corresponding to a purchase of the smart device, where the assistant output is an offer for help for installing the smart device. In some of those implementations, the received input corresponds to affirmative user interface input in response to the offer for help installing the smart device. The affirmative user interface input is provided through interaction of the user with one or more user interface input devices of the client device.

In some implementations, a method performed by one or more processors is provided and includes: determining, based on received input, that a smart device is to be configured by a user; and providing, by an automated assistant interface of a client device or additional client device of the user, an instruction for capturing an image associated with configuration of the smart device. The method further includes receiving the image based on the user capturing the image in response to the provided instruction. The image is captured via a camera of the client device or an additional client device of the user. The method further includes: determining a characteristic of the configuration based on the received image; and providing, by the automated assistant interface, a configuration instruction for configuring the smart device. The provided configuration instruction is based on the determined characteristic of the configuration.

In some implementations, determining that the smart device is to be configured by the user comprises determining that configuration of the smart device has begun, but has not yet been completed by the user. In some of those implementations, the method further includes determining, based on the input, a state of the configuration of the smart device. In some versions of those implementations, the initial instructions are tailored to the state of the configuration of the smart device.

These and other implementations of technology disclosed herein may optionally include one or more of the following features.

In some implementations, the determined characteristic is based on a comparison of the received image to other configuration images. The other configuration images are associated with previous configurations of similar smart devices.

In some implementations, the determined characteristic is based on application of the received image to a trained machine learning model. The trained machine learning model can be trained based on training instances that each include training instance input of a corresponding image, and training instance output that indicates whether the characteristic and/or other characteristics are indicated by the corresponding image.

In some implementations, the method further includes: accessing account information to identify applications associated with the user; and determining that a camera application is associated with the user. In some of those implementations, the instruction identifies the camera application and/or is provided based on determining that the camera application is associated with the user.

In some implementations, the received image corresponds to wires for connecting to the smart device, and the characteristic of the configuration corresponds to a wiring issue identified in the image.

In some implementations, determining that the smart device is to be configured by the user comprises determining that configuration of the smart device has begun, but has not yet been completed by the user. In some of those implementations, the method further includes determining, based on the input, a state of the configuration of the smart device. In some versions of those implementations, the instruction for capturing the image is provided based on the state of the configuration of the smart device.

In some implementations, a method performed by one or more processors is provided and includes: providing, via an automated assistant interface of a client device, one or more instructions for configuring a smart device; and determining that the user did not perform a complete configuration of the smart device via interaction with the automated assistant interface. In some of those implementations, the method further includes, in response to determining that the user did not complete the configuration of the smart device via the interaction with the automated assistant interface: monitoring to determine whether the complete configuration occurred independent of interaction with the automated assistant interface. The method further includes, in response to determining the complete configuration did not occur independent of interaction with the automated assistant interface: providing, via the client device, further user interface output for performing the complete configuration.

These and other implementations of technology disclosed herein may optionally include one or more of the following features.

In some implementations, determining that the user did not perform the complete configuration of the smart device via the interaction with the automated assistant interface includes: determining that user interaction with the automated assistant interface ceased prior to the complete configuration being indicated via feedback received from the smart device or via a configuration state maintained by a component managing the interaction with the automated assistant interface.

In some implementations, the complete configuration is a configuration that is free of one or more configuration issues. In some of those implementations, determining the complete configuration did not occur independent of interaction with the automated assistant interface includes: determining that a particular configuration issue, of the configuration issues, is present. In some versions of those implementations, the further user interface output corresponds to instructions that are tailored to address the configuration issue. The configuration issue can be, for example, a network connectivity problem of the smart device and/or a sub-optimal configuration of the smart device.

In some implementations, a method implemented by one or more processors is provided and includes determining, based on received input, that a smart device is to be configured by a user. The method further includes receiving a query submitted by the user via an automated assistant interface of a client device of the user, the client device being separate from the smart device. The method further includes, based on determining that the smart device is to be configured by the user, generating a response to the query that is based on the query and based on context information of the smart device. The method further includes providing, via the automated assistant interface of the client device, the response to the query that is based on the query and based on the context information of the smart device.

These and other implementations of the technology disclosed herein may optionally include one or more of the following features.

In some implementations, the query is submitted via the automated assistant interface prior to any utilization of the automated assistant interface by the user in configuring the smart device. In some of those implementations, determining that the smart device is to be configured by the user is based on: one or more signals generated by the smart device and/or one or more image(s) captured of the smart device in an environment of the user. In some additional or alternative implementations, the context information of the smart device includes content that: identifies the smart device and/or identifies a current state of configuration of the smart device.

In some implementations, generating the response to the query that is based on the query and based on the context information of the smart device includes: generating a modification of the query based on the context information; and generating the response based on the modification of the query. In some of those implementations, generating the response based on the modification of the query includes submitting the modification of the query to a search system, and receiving the response from the search system in response to submitting the modification of the query. In some additional or alternative implementations, generating the modification of the query includes adding one or more context terms to the query, where the context terms are based on the context information of the smart device. For example, the context terms can include a make, model, and/or other reference that identifies the smart device. Also, for example, the context terms can additionally or alternatively identify a current state of configuration of the smart device.

In some implementations, a method implemented by one or more processors is provided and includes determining, based on received input, that a smart device is to be configured by a user. The method further includes, determining, based on a current state of configuration of the smart device and/or based on one or more attributes of the user, an instruction to provide to the user. The instruction is determined based on past computing actions, of a plurality of users, that are related to configuring the smart device. The method further includes, providing the instruction for presentation to the user via an automated assistant interface of a client device of the user. The client device is separate from the smart device.

These and other implementations of the technology disclosed herein may optionally include one or more of the following features.

In some implementations, providing the instruction for presentation occurs independent of user interface input submitted via the automated assistant interface. In some of those implementations, providing the instruction for presentation occurs prior to any utilization of the automated assistant interface by the user in configuring the smart device.

In some implementations, the one or more past computing actions utilized in determining the instruction include past searches. The past searches can include past searches submitted during configuring the smart device through interactions with an automated assistant and/or past searches submitted independent of interactions with an automated assistant.

In some implementations, the instruction is determined based on one or more attributes of the user, and is determined based on the plurality of users also having the one or more attributes.

In some implementations, determining that the smart device is to be configured by the user is based on: one or more signals generated by the smart device and/or one or more image(s) captured of the smart device in an environment of the user.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
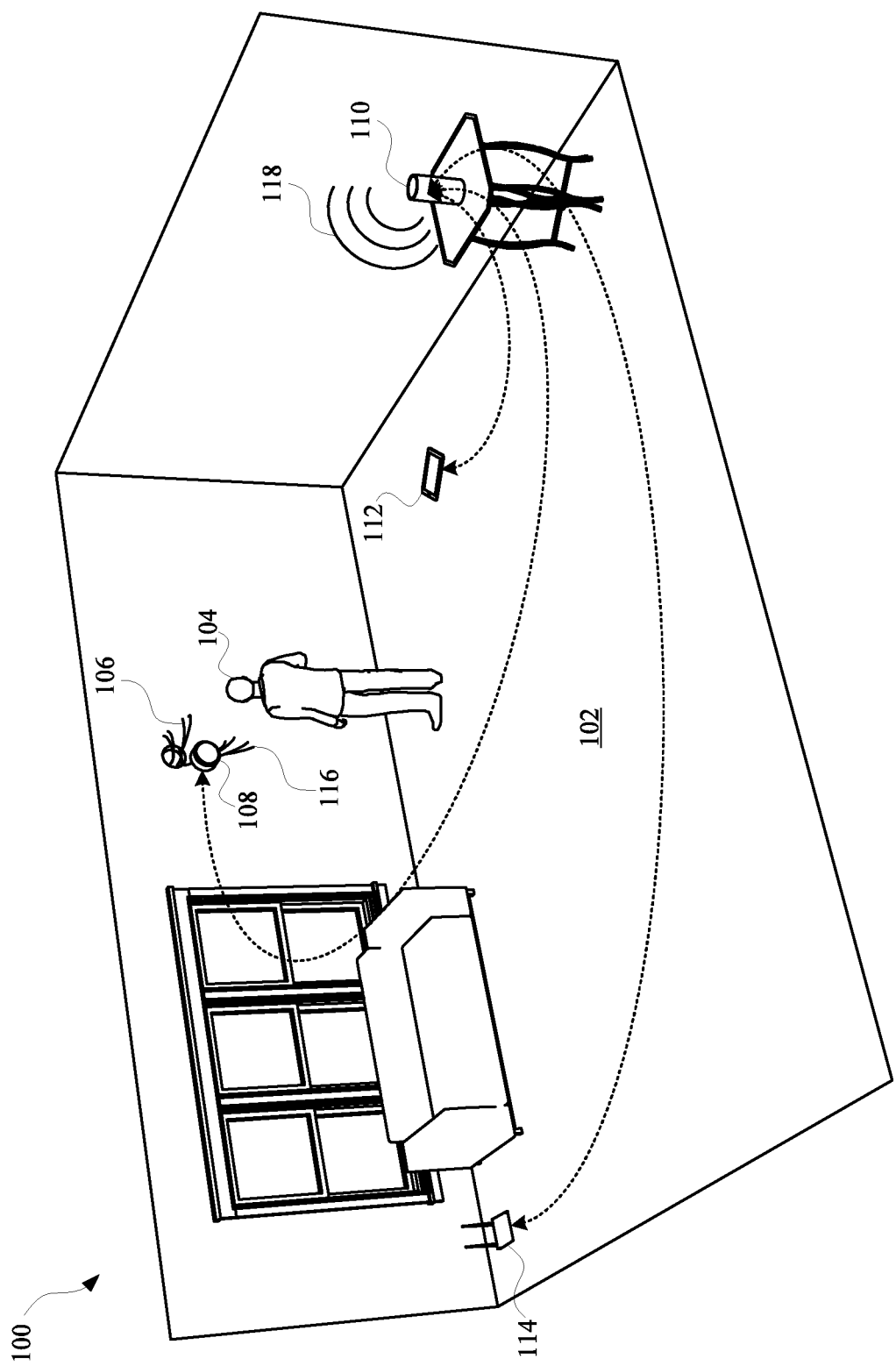
FIG. 1 illustrates a perspective view of a user configuring a smart device according to instructions tailored in response to feedback received during the configuring.

FIG. 1 illustrates a perspective view 100 of a user 104 configuring a smart device 108 according to instructions tailored in response to feedback received during the configuring. The smart device 108 can be any computing device capable of communicating with other devices to perform a task. For example, the illustrated smart device 108 can be a thermostat device that is capable of controlling the temperature of the home 102. However, the smart device 108 can be any other device such as a smart light, smart fan, smart appliance (e.g., refrigerator, washing machine, oven, microwave, etc.) and/or any other device.

A smart device can be a device that includes one or more processors, memory, and communications hardware (e.g., for communicating over Wi-Fi or other communication channel(s)). In some implementations, a smart device can be characterized as such based on its limited functionality with respect to its hardware and/or software capabilities. For example, some smart devices may not include a touch screen display and/or other dynamic direct user interface. As another example, some smart devices may include firmware but not be capable of supporting additional third party applications. As yet another example, some smart device may be configured for receiving power from non-wall outlet sources such as a hardwired source, a light fixture socket, and/or any other non-wall outlet source. Furthermore, some smart devices can be mounted in places not typical for a personal computing device, such as a wall, a ceiling, and/or other structure. However, it should be noted that although some smart devices can have one or more of the aforementioned features, other smart devices may not—and may indeed be quite robust hardware and/or software wise.

Typically, in order to install or configure the smart device 108 to operate in a home 102, the user 104 must perform some amount of labor. However, in order to provide the user 104 with the most efficient method for configuring the smart device 108, an automated assistant can provide tailored instructions to the user 104. The instructions can be tailored according to feedback received from the smart device 108, a networked device 114 in the home 102, a personal computing device 112, a client device 110 that includes an automated assistant application, a remote device that is in communication with the client device 110, and/or any other source of data that is relevant to the configuration of the smart device 108.

The automated assistant can determine that the user 104 has recently acquired the smart device 108 and offer assistance configuring the smart device 108 in response. The automated assistant can determine that the user 104 has acquired the smart device 108 in a variety of ways. For example, the smart device 108 can provide a direct or indirect signal to the client device 110 via BLUETOOTH, Wi-Fi, a local area network, a wide area network, or any other connection suitable for transmitting data. This can occur when the smart device 108 is within a threshold distance of the client device 110, allowing the automated assistant to acknowledge the smart device 108 and prepare to provide tailored instructions in response. Alternatively, the automated assistant can be aware that the user 104 acquired the smart device 108 using data of the user that is available to the automated assistant. The data can include, for example, emailed receipts corresponding to recent purchases made by the user 104. When the receipts include information that identifies the smart device 108, the automated assistant can be put on notice that the smart device 108 has been acquired by the user 104 and prepare to provide the tailored instructions in response. In yet other implementations, the client device 110 can include a camera, and when the user 104 comes home 102 with the smart device 108, the client device 110 can be aware of the smart device 108 via images captured by the camera. For example, the camera can capture the images of packaging of the smart device 108 in response to motion detected by the client device 110 as the user 104 is entering the home 102. The images can then be analyzed by the client device 110, or a separate device, to identify the smart device 108. In response to identifying the smart device 108, the automated assistant can provide tailored instructions for configuring the smart device 108 in the home 102.

Once the user 104 has brought the smart device 108 to the home 102, the user 104 can ask the automated assistant for assistance with configuring the smart device 108, or the automated assistant can affirmatively prompt the user 104 to ask whether the user 104 would like assistance configuring the smart device 108. The user 104 can ask the automated assistant for assistance by audibly speaking at the client device 110 to invoke the automated assistant (e.g., "Could you help me configure my new device?"), or using a personal computing device 112 to remotely invoke the automated assistant at the client device 110. Remotely invoking the automated assistant can entail the user 104 speaking into the personal computing device 112 or typing a command into the personal computing device 112. Alternatively, the automated assistant can prompt the user 104 to ask whether the user would like assistance in response to the automated assistant determining that the smart device 108 is in the home 102. The automated assistant can provide an audible output 118 such as "would you like assistance configuring the smart device" or "would you like to schedule a time for configuring the smart device?"

In some implementations, the user 104 can begin configuring the smart device 108 without assistance from the automated assistant, and the automated assistant can determine that the steps taken by the user 104 are not optimal or are incorrect. In such cases, the automated assistant can provide an output such as "Looks like you might need a hand setting up your device" in order to put the user on notice that the automated assistant is available to help configure the smart device 108. In response, the user 104 can agree to start the configuration process or delay the configuration process to a time that can be scheduled by the automated assistant. As another example, the automated assistant can detect a signal or feedback from the smart device 108 as the user is attempting to configure the smart device 108. The automated assistant can determine, based on the feedback, that the user 104 is incorrectly configuring the smart device 108 (e.g., connecting an incorrect wire). In response, and without being prompted by the user 104, the automated assistant can offer instructions for configuring the smart device 108, and the instructions can be tailored to initially address any existing issues. For example, the automated assist can provide an output such as "I see you've incorrectly connected the wires. Please disconnect the wires and let's start configuring your smart device." In this way, the user 104 does not have to individually troubleshoot the configuration attempt later on, and can seamlessly transition to executing instructions from the automated assistant.

Should the user 104 agree to begin the configuration process for the smart device 108, the automated assistant can lookup instructions for configuring the smart device 108. Initial instructions for configuring the smart device 108 can be stored at the client device 110, a remote device such as a server connected to the client device 110 over the internet, and/or any other device that can communicate with the automated assistant. The automated assistant can provide a first instruction to the user 104 via an automated assistant interface, which can be an audio interface of the client device 110 or personal computing device 112, and/or a graphical interface provided via a display panel of the client device 110 or personal computing device 112. For example, the initial instruction can correspond to a step of attaching a smart device wire 116 to a home wire 106. The smart device wire 116 can be a power wire or communications wire of the smart device 108 that connects to the home wire 106 to enable the smart device 108 to perform a function (e.g., changing a temperature of the home 102). In some instances, an issue can occur when the smart device wire 116 is connected to the home wire 106 by the user 104 and, in response, the smart device 108 can provide hardware related feedback to the client device 110. The automated assistant can receive the feedback from the smart device 108 (directly and/or via one or more intermediary network components) and use the feedback to tailor further instructions for the user 104 to remedy the issue and complete the configuration. For example, the feedback can correspond to a signal that indicates an improper wire was attached to the smart device wire 116. The automated assistant can interpret the feedback accordingly and adapt the further instructions to include one or more steps for detaching the improper wire and attaching the proper wire to the smart device 108. The tailored instructions can then be provided from the client device 110 as audible output 118, or provided from the personal computing device 112, in order to further the collaboration between the user 104 and automated assistant in configuring the smart device 108.

In some implementations, the instructions can be tailored based on feedback from a device that is separate from the smart device 108. In such cases, the feedback can be from a device in the home 102 such as the personal computing device 112, which can be a cellular device, tablet device, and/or any other computing device capable of being controlled by a user 104. Alternatively, the feedback can be from a networked device 114 such as a router, appliance, power supply, and/or any other device capable of communicating with the client device 110. For example, the networked device 114 can be a router that can provide network connectivity data to the client device 110. As part of the configuration process of the smart device 108, the automated assistant can direct the user 104 in connecting the smart device 108 to the Wi-Fi connection provided by the router. In some instances, the router can indicate an issue with the connection between the smart device 108 and the networked device 114. The issue can relate to a security issue with the smart device 108 because of outdated software operating on the smart device 108. The automated assistant can receive feedback provided to the client device 110 from the networked device 114, and use the feedback to tailor further instructions to address the issue. For example, prior to receiving the feedback, the next instruction could have directed the user 104 to register their smart device 108 over the internet. However, in response to the feedback, the automated assistant can tailor the next instruction to direct the user 104 to hardwire the smart device 108 to the networked device 114 to perform an update and then register the smart device 108 while still hardwired to the networked device 114. In this way, the steps for addressing the issue can be reduced because the user 104 did not have to query the automated assistant regarding the issue. Furthermore, the user 104 may not have been aware that there was an issue in some cases, because the feedback associated with the issue was not communicated to the user 104.

In some implementations, the automated assistant can tailor the instructions to include steps for employing another device for assisting with the configuration of the smart device 108. The automated assistant can determine the devices that are associated with the user 104 by accessing account data that identifies each device that the user 104 has logged into, or has otherwise used. Furthermore, the automated assistant can determine applications available at each device that is associated with the user. The automated assistant can then use this information about the applications and devices to tailor the instructions for configuring the smart device 108. For example, the smart device 108 can be a thermostat that includes smart device wires 116 of different colors, and each of the smart device wires 116 must be connected to specific home wire 106 of a specific color. However, because some homes can include different wire color arrangements, the instructions must include steps for identifying the wires that are available and the appropriate wires to connect. In order make these steps more efficient, the automated assistant can determine that a camera application exists on the personal computing device 112. The automated assistant can tailor the instructions for configuring the smart device 108 by including steps for using the camera application to capture an image of the home wires 106, and send the image to the automated assistant. In this way, the automated assistant can analyze the image to determine the wire color arrangement of the home wires 106 and further tailor the instructions for wiring the smart device 108 according to the determined wire color arrangement. This can reduce the number of steps and the number of exchanges between the user 104 and the automated assistant, thereby simplifying the configuration process. Furthermore, tailoring the instructions to employ other applications and devices already available to the user 104 can assist the user 104, should the user 104 have an impairment.

In implementations where images or other content is captured and utilized to determine characteristic(s) for adapting provided guidance, the characteristics can optionally be determined based on applying the content to a trained machine learning model. For example, the trained machine learning model can be trained to accept an image as input and to generate, based on the applied input, output that indicates the characteristic(s). For instance, a machine learning model can be trained to determine wiring characteristics based on supervised learning that utilizes labeled training instances. Each training instance can include training example input that is image that includes wiring and training example output that indicates a labeled characteristic of the wiring. For example, a first training example can include a first image and a label that indicates "configuration A", a second training example can include a second image and a label that indicates "configuration B", a third training example can include a third image and a label that indicates "configuration C". Through training based on such training examples, parameters can be learned that enable the machine learning model to be utilized to predict, based on an applied image, which of multiple wiring configurations is present in the image.

Figure 2:
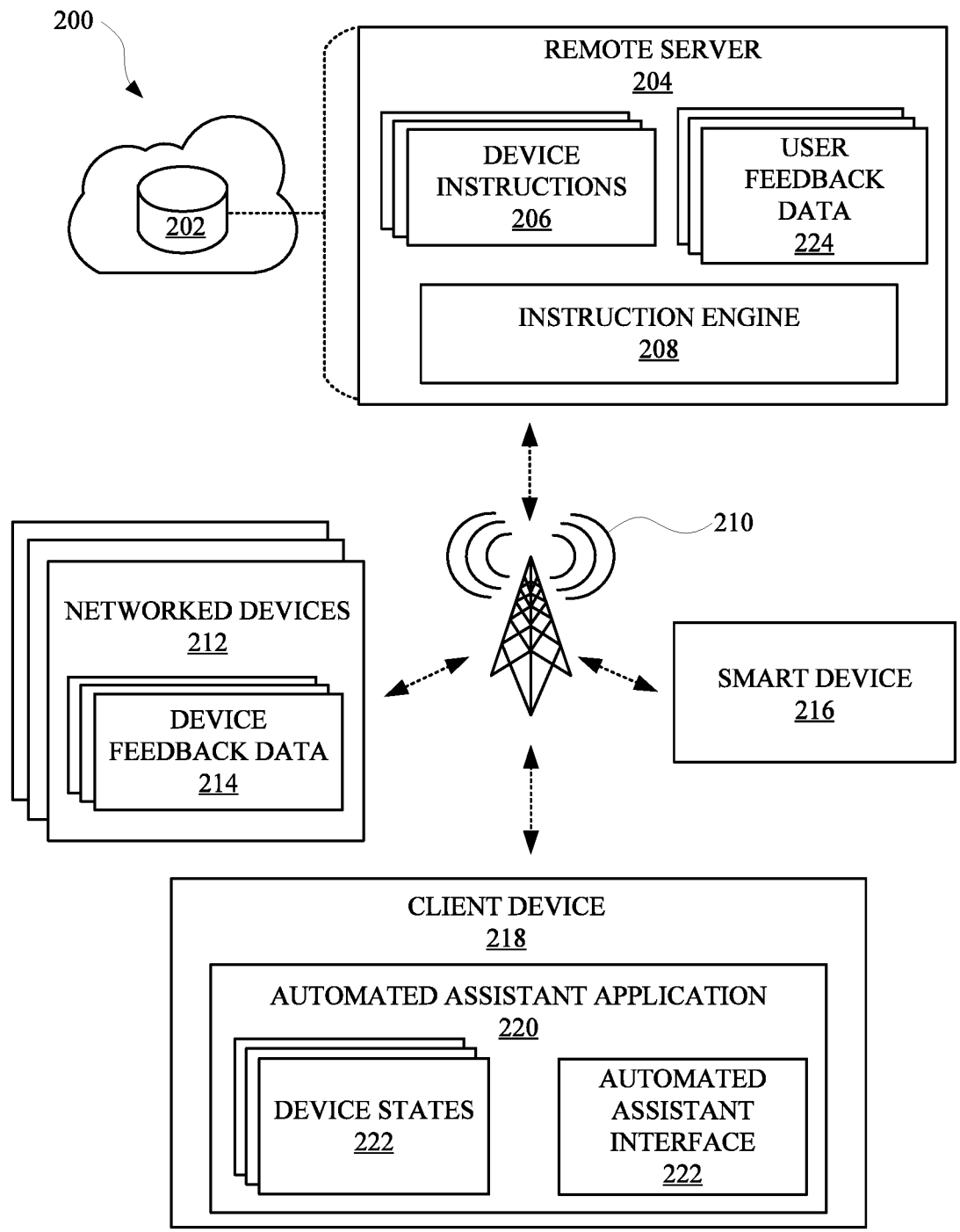
FIG. 2 illustrates a system for tailoring instructions for configuring a smart device.

FIG. 2 illustrates a system 200 for tailoring instructions for configuring a smart device 216. The smart device 216 can be a recent purchase of a user, and therefore the user may need assistance configuring the smart device 216 in their home. In order to receive assistance for configuring their smart device 216, a client device 218 in the home of the user can be queried by the user to provide assistance for the configuring of the smart device 216. The client device 218 can include an automated assistant application 220 that can provide assistance to the user and act to control devices in the home. The automated assistant application 220 can engage with the user through an automated assistant interface 222, which can be an audio interface and/or a display interface. For example, upon the user purchasing their smart device 216 and bringing the smart device 216 home, the automated assistant application 220 can ask the user, through audio or text, whether they would like assistance configuring the smart device 216. If the user agrees to receive assistance, the automated assistant application can access device instructions 206 for providing to the user. Furthermore, the device instructions 206 can be tailored before, during, and/or after an initial step for configuring of the smart device 216 in order to handle any issues that might come up during the configuration process. For example, the automated assistant application 220 can provide the user with a first instruction for configuring the smart device 216. The first instruction can be provided from a separate device 202, which can be a remote server 204 that includes an instruction engine 208 for generating configuration instructions for a smart device 216.

During configuration of the smart device 216 according to the first instruction, the smart device 216 can provide feedback to the client device 218 indicating an issue with the smart device 216. The client device 216 can communicate the feedback to a remote server 204, which can use the feedback to adapt instructions that address issues corresponding to the feedback. Alternatively, a networked device 212 that is connected to the client device 218 over the network 210 can also collect device feedback data 214 and provide the device feedback data 214 to the client device 218 and/or the remote server 204. For example, the networked device 212 can be a motion sensing camera that can provide information about the details of a room in which the smart device 216 is being configured. The information can include images corresponding to the configuration of the smart device 216, and the images can be provided to the automated assistant application 220 or the remote server 204 for analysis. The automated assistant application 220 and/or the remote server 204 can compare the received images to user feedback data 224 corresponding to previous configurations of other similar smart devices. By comparing the images to the user feedback data 224, issues associated with configuring the smart device 216 can be predicted and their solutions can be incorporated into the instructions provided to the user through the automated assistant application 220.

In some implementations, the automated assistant application 220 can track device states 222 of the smart device 216 as the user configures the smart device 216. For example, upon the user acquiring the smart device 216, the device state 222 for the smart device 216 can be stored as non-configured or uninstalled. Once the user performs a step of the installation instructions, such as connecting the smart device 216 to power, the device state 222 for the smart device 216 can be updated according to the step that was completed. In this way, should the user fail to complete the configuration of the smart device 216, the automated assistant application 220 can have a reference point for determining where the configuration was discontinued.

In some implementations, the automated assistant application 220 can monitor the smart device 216 and/or the user while the instructions have been discontinued. For example, the smart device 216 can be monitored to identify issues (e.g., power and connectivity issues) that might be associated with the smart device 216 during a time when the instructions have been discontinued. Furthermore, the automated assistant application 220 can determine when the user is available to continue configuring the smart device 216. The automated assistant application 220 can also compile any issues identified during the period when the instructions were discontinued. The automated assistant application 220 can communicate the issues to the remote server 204 in order that the instruction engine 208 of the remote server 204 can tailor further instructions to address the issues identified during the period when the instructions were discontinued. The instruction engine 208 can generate the further instructions for both completing the configuration of the smart device 216 and addressing the issues identified by the automated assistant application 220, the instructions can be provided to the automated assistant application 220. Sometime thereafter, the automated assistant application 220 can continue providing the instructions to the user via the automated assistant interface 222.

Figure 3:
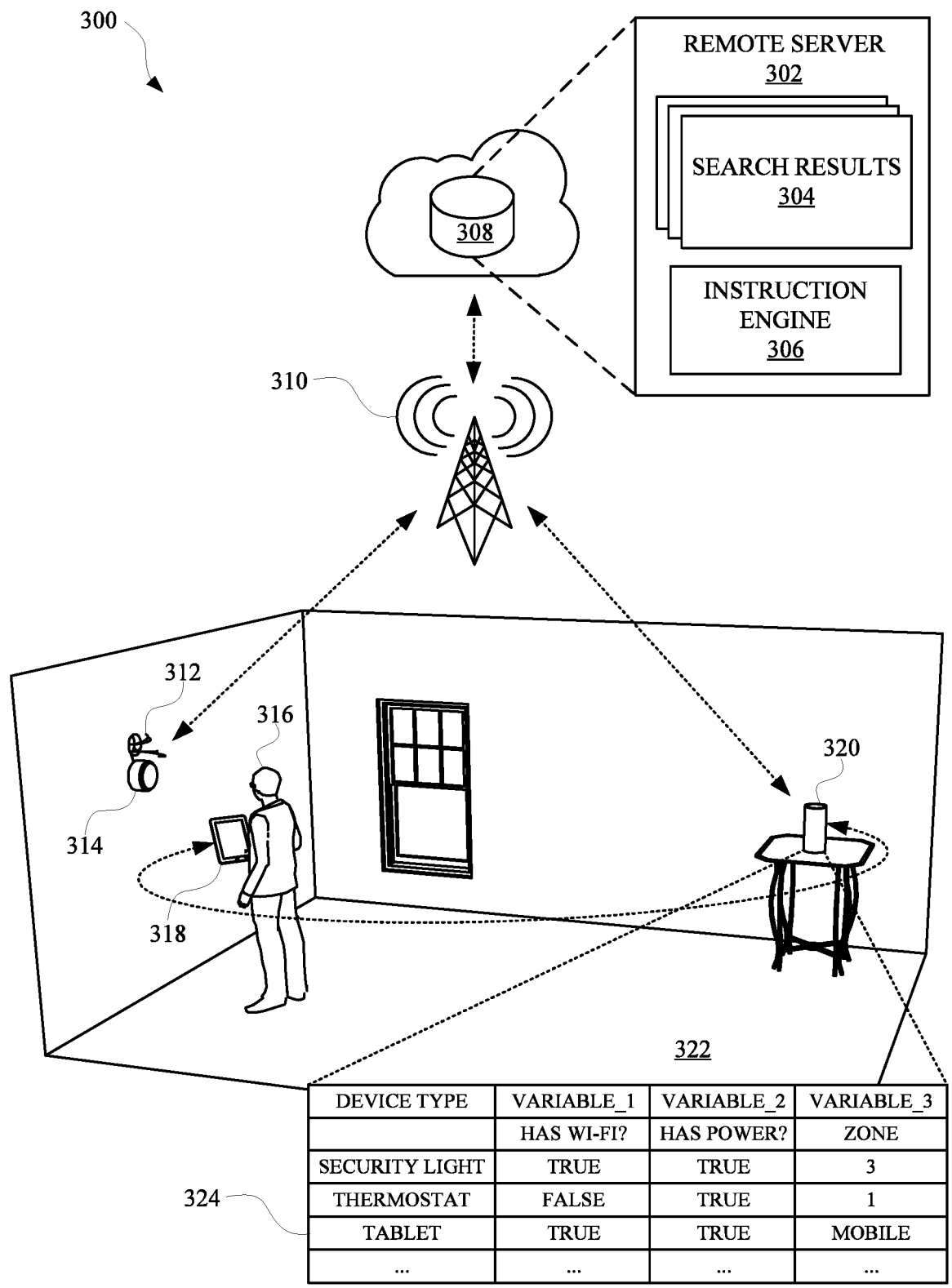
FIG. 3 illustrates a diagram of a user configuring a smart device using instructions provided by an automated assistant application of a client device, which can also receive search queries from the user, while the user is receiving instructions.

FIG. 3 illustrates a diagram 300 of a user 316 configuring a smart device 314 using instructions provided by an automated assistant application of a client device 320, which can also receive search queries from the user 316, such as search queries submitted during an instructional session when the automated assistant application is providing guidance to the user 316. For example, the user 316 can acquire a smart device 314 for installing in their home 322 and query the automated assistant application for assistance with installing the smart device 314. The instructions can include a step of connecting wires 312 of the home to wires of the smart device 314. In attempting to connect the wires 312 of the home to the wires of the smart device 314, the user 316 can have questions regarding the wiring, the smart device 314, or any other matter associated with connecting devices in the home 322. The user 316 can provide the query to the automated assistant application through a vocal or textual command that can be provided directly to the client device 320, or a personal computing device 318 that can route the query to the client device 320. In response to receiving the query, the automated assistant application can access a separate device 308, such as a remote server 302, over a network 310 for identifying an answer to the query. For example, the remote server 302 can be a search system that generates search results 304 in response to the query from the client device 320, and the search results 304 can be filtered (e.g., by the search system) in order to identify a suitable response to the query (e.g., a single response may be provided as an "answer" to the query). If the query relates to the instructions, an instruction engine 306 of the remote server 302 can tailor further instructions to both respond to the query and further the configuration process. For example, the query can correspond to a question related to the grounding of the smart device 314 to the home 322. Specifically, the user 316 can ask the automated assistant application whether a copper or black wire of the home wires 312 are ground wires that can be used to ground the smart device 314. In response, the automated assistant application can access the search results 304 for answering the query and modify the instructions such that the wiring is explained in the instructions (e.g., "The copper wire is the ground wire and should be connected to the ground terminal of your smart device.") In this way, the process of providing instructions from the automated assistant application is uninterrupted by the query from the user.

In some implementations, a user can submit a query via an automated assistant interface, and the automated assistant can generate a response to the query based on the query itself, and based on smart device context information. For example, the query submitted by the user can be modified to include terms related to the make and/or model of the smart device and/r to include terms related to the current state of the configuring of the smart device. In some of those implementations, the user can submit the query during utilization of the automated assistant interface in receiving guidance for configuring the smart device. In some other of those implementations, the user can submit the query without having previously utilized the automated assistant interface in receiving guidance for configuring the smart device. In these and other manners, automated assistant responses to user queries can be generated in view of smart device context information, even in situations where the user has not, prior to the query, engaged the automated assistant in configuring the smart device.

In some implementations, the client device 320 (or separate device) can track the configurations of each device located in the home 322 using a table 324 stored by the client device 320 and/or the remote server 302. The table 324 can identify each device (e.g., a security light, a thermostat, a tablet, etc.) as well as certain features of each device (e.g., Wi-Fi enabled, powered, etc.). If a particular feature of a device is not configured as a result of the user 316 opting to discontinue a configuration process, the client device 320 (or separate device) can identify the feature in the table and indicate that the feature was not configured (e.g., the feature can be labeled "false" to indicate it is not operational). For example, the feature can be a Wi-Fi connection and the smart device 314 can communicate to the client device 320 that the Wi-Fi connection was not setup. In response, the automated assistant can update the table 324 to indicate the Wi-Fi connection was not setup. As another example, the automated assistant can prompt the user to perform a configuration step (e.g., "connect the wires and let me know when you're done"). The user can confirm the configuration was completed (e.g., "Ok, I'm done") and, in response, the automated assistant can update the table 324 to indicate the feature associated with the configuration step was configured. At a later time, the automated assistant application can prompt the user 316 about continuing the configuration process in order to setup a certain feature of a smart device 314 (e.g., connecting the thermostat to Wi-Fi) and/or complete a configuration process of the smart device 314. The prompt can be in response to the user 316 entering a room that includes the device, the automated assistant determining that the user 316 has time to complete the configuration process, and/or the user 316 asking the automated assistant about setting up the feature of the smart device 314. Once the user 316 has completed the configuration step corresponding to the feature identified in the table 324, the table 324 can be updated to indicate that the feature has been configured for the smart device 314 (e.g., the feature can be labeled "true"). Thereafter, should the user 316 choose to continue the configuration process or discontinue the configuration process, the automated assistant can be aware of the progress of the configuration process.

In some implementations, the automated assistant can provide assistance for reconfiguring devices in a new residence of the user 316. The automated assistant can determine that the user 316 has moved residences based on location data and/or connectivity data obtained by the client device 320 and/or the personal computing device 318. For instance, the client device 320 can be connected to a first local area network at a first time, be disconnected from any network during a second time, and then be connected to a second local area network at a third time. The length of time that the client device 320 was disconnected from a network, and the change in networks, can indicate to the client device 320 that the user 316 has changed residences.

In response to determining that the user 316 has changed residences, the automated assistant can offer assistance to the user 316 for reconfiguring devices in the new residence, and disassociating from any devices (e.g., appliances) that were left in the former residence. For example, some devices in the former residence may have been designated to particular locations or zones in the former residence. The automated assistant can store the zones of the devices in the table 324 and use the table 324 to re-zone the devices in the new residence. For example, the automated assistant can prompt the user with the question "I noticed you moved residences. Would you like me to re-zone your devices according to the zoning of the previous residence?" If the user 316 agrees, the automated assistant can proceed with re-zoning the devices so that any devices that depend on the zoning (e.g., a thermostat) can begin operating again, without the user 316 having to manual re-zone the devices to specific rooms. Furthermore, any schedules (e.g., lighting schedules, low power mode schedules, security alarm schedules, etc.) that may have been followed by devices from the previous residence can be migrated to the new residence, either by explicit request from the user 316, or automatically by the automated assistant. Migration of the schedules can be tailored into the instructions for configuring one or more devices in the new residence. For example, the instruction engine 306 can be notified of the change in residence of the user 316 and use information related to the new residence for adapting steps for configuring the smart device 314. The automated assistant can received the adapted steps and provide an output such as "while you're providing the Wi-Fi password to the smart device, would you like me to use the same schedules from your previous residence for all the devices?" In this way, because the migration can take some amount of time, the automated assistant can conserve time performing the migration while the user 316 is performing some other action (e.g., providing a password) that would not interfere with the migration. Tailoring configuration instructions in this way ensures that user will be taking advantage of each feature of their devices, while streamlining the instructions to be less taxing on the user 316.

Figure 4:
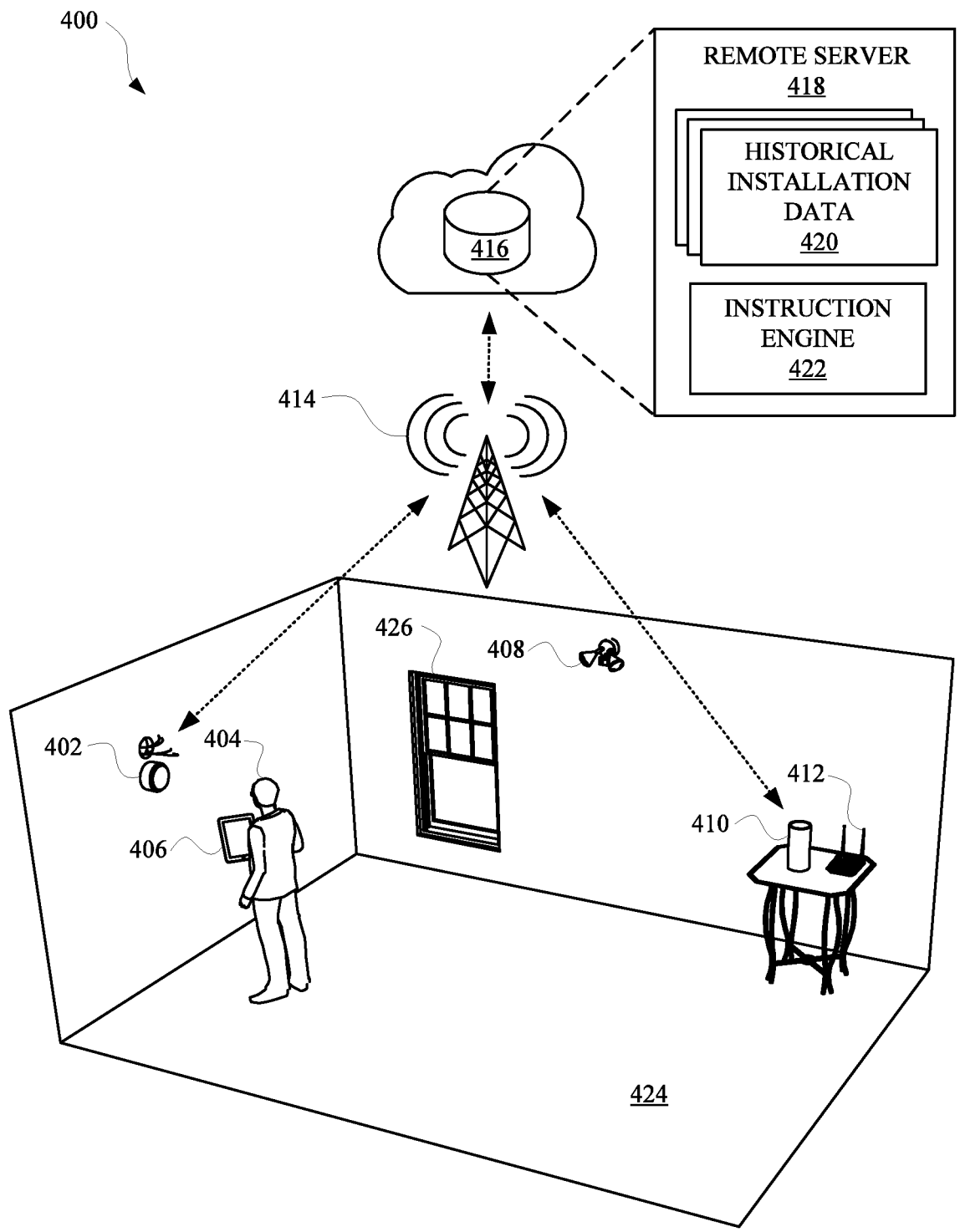
FIG. 4 illustrates a perspective view of a user configuring a smart device in a home according to instructions that are tailored based to historical installation data associated with previous installations of similar smart devices.

FIG. 4 illustrates a perspective view 400 of a user 404 configuring a smart device 402 in a home 424 according to instructions that are tailored based on historical installation data 420 associated with previous installations of similar smart devices. A user 404 can acquire the smart device 402 and bring it home 424 to install. A client device 410, that includes an automated assistant application can detect the presence of the smart device 402 and offer the user 404 assistance with configuring the smart device 402 in the home 424. The automated assistant can identify the smart device 402 and acquire instructions for configuring the smart device 402 from a separate device 416, which can be a remote server 418. The remote server 418 can include an instruction engine 422 for generating instructions for configuring the smart device 402 based on information obtained about the smart device 402. The automated assistant can audibly or textually provide the instructions at an interface of the automated assistant. However, in order to optimize the configuration process and reduce the number of steps to be performed by the user 404, the client device 410 and/or a network device 412 in the home 424, can identify other devices in the home 424 capable of assisting the user 404. For instance, the client device 410 or the networked device 412 can employ a packet analyzer capable of detecting other devices that are on the same network as the client device 410, such as a smart light 408 or a personal computing device 406. The packet analyzer can, for example, analyze contents of packets or headers of packets transmitted over one or more channels of a network 414 that is accessible to the devices in the home 424. The network 414 can be a local area network, a wide area network, and/or any other network where packets are transmitted between devices.

Once the automated assistant has identified one or more other devices that can assist with the configuration of the smart device 402, the automated assistant or the remote server 418 can tailor the instructions accordingly. For instance, packets from the smart light 408 can be analyzed by the client device 410 and/or the network device 412, and the smart light 408 can be identified by the automated assistant. The automated assistant can indicate to the remote server 418 that the smart light 408 is available for assisting in the configuration of the smart device 402. In response, the instruction engine 422 can generate tailored instructions that include steps involving the smart light 408. For example, the instructions can be tailored during the configuration process of the smart device 402, and the automated assistant can read the tailored instructions and provide an output such as "Please step back so that the smart light can see where the smart device is being installed." The location of the smart device 402 in the home 424 can be captured by a camera of the smart light 408 and an image that identifies of the location of the smart device 402 can be transmitted from the smart light 408 to the client device 410 and/or the remote server 418. In some implementations, the smart device 402 can include an accelerometer that can be used to identify an orientation of the smart device 402. Data collected by the accelerometer of the smart device 402 can also be transmitted to the client device 410 and/or the remote server 418 to determine an orientation of the smart device 108.

The remote server 418 can compare the image and/or accelerometer data to historical installation data 420 to determine whether the location and/or orientation of the smart device 402 is suitable for operations of the smart device 402. The historical installation data 420 can include images or information associated with similar smart devices in homes that are comparable to the home 424 where the smart device 402 is being configured. The remote server 418 can determine whether the location of the smart device 402 should be adjusted to optimize performance. For example, if the smart device 402 is a thermostat, the remote server 418 can determine that the thermostat should be moved further away from a window 426 to avoid biasing temperature measurements of the smart device 402. In response, the instruction engine 422 can tailor the instructions to include steps for advising the user 404 about moving the smart device 402 away from the window 426. The automated assistant can receive the updated instructions from the remote server 418 and announce to the user 404 "Thanks for stepping back. The view from the smart light indicates that the smart device is too close to the window and should be moved laterally away from the window." Once the user 404 moves the smart device 402 laterally according to the tailored instructions, the automated assistant can provide further instructions based on the devices available in the home 424. For instance, the next step in the instructions can be to configure a schedule of operation for the smart device 402. The automated assistant can determine that the user 404 owns a personal computing device 406 with a calendar application that can help with scheduling the operation of the smart device 402, and therefore reduce the number of steps for configuring the smart device 402. For example, the automated assistant can tailor the subsequent instructions to include a query regarding using data from the calendar application. The automated assistant can ask, "would you like me to configure the operation of the smart device according to your calendar application?" If the user 404 agrees, the automated assistant can either cause the personal computing device 406 to directly provide data to the smart device 402, or retrieve information from the personal computing device 406 for configuring the smart device 402. In this way, devices and data already available to the automated assistant can be leveraged to tailor instructions for configuring the smart device 402.

As another example, the remote server 418 can receive an image of wires of the home 424 and compare the image to images in the historical installation data 420. For example, the historical installation data 420 can contain queries and solutions associated with previous installations of similar smart devices. Such queries can include questions from a user regarding what certain wires are (e.g., "Assistant, is this bare copper wire a ground wire?"). The remote server 418 can also store images related to previous installations and tag the images to label features that might be useful for future installations. For example, an image of the wires from the home 424 can be compared to the tagged images to identify a ground wire for the smart device 402. The remote server 418 can determine based on the comparison, further instructions for configuring the smart device 402 according to the wiring of the home 424. The automated assistant can use the further instructions to provide output such as "I see your home has a bare copper ground wire, please connect the bare copper wire to the ground terminal of the smart device."

Figure 5:
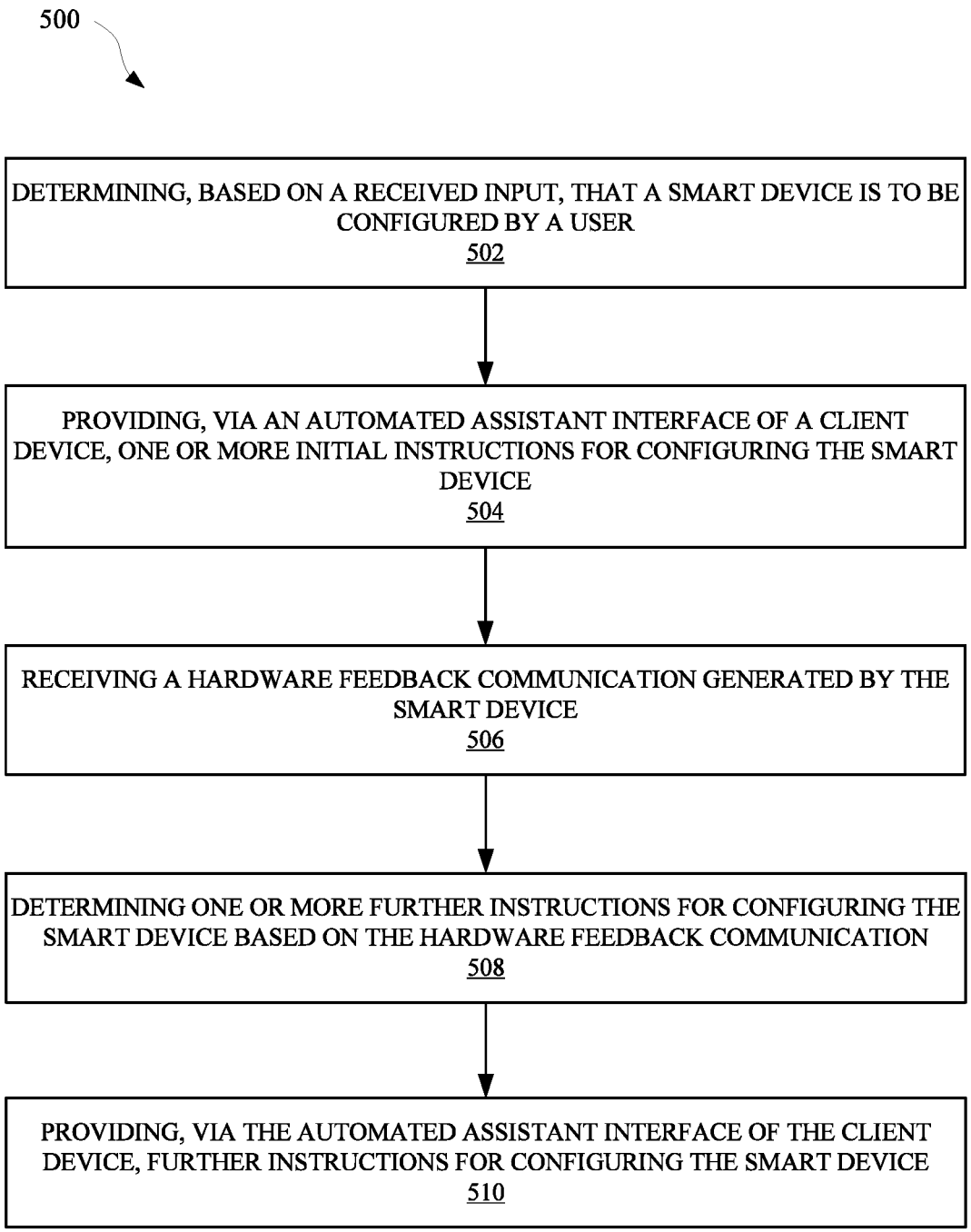
FIG. 5 illustrates a method for adapting instructions for configuring a smart device based on feedback received during the configuring of the smart device.

FIG. 5 illustrates a method 500 for adapting instructions for configuring a smart device based on feedback received during the configuring of the smart device. The method 500 can be performed by a client device, a network device, and/or any other computing device capable of providing instructions to a user.

The method 500 can include a block 502 of determining, based on a received input, that a smart device is to be configured by a user. The smart device can be any computing device capable of using feedback to perform a task, such as monitor a home. The received input can be information provided from a server that manages user data that can include purchases made by the user. Alternatively, the received input can be a signal directly or indirectly provided by the smart device via wireless communication protocol such as BLUETOOTH or Wi-Fi. At block 504, one or more initial instructions for configuring the smart device can be provided via an automated assistant interface of a client device. The automated assistant interface can be associated with an automated assistant application stored on the client device, or otherwise accessible to the client device. The automated assistant application can assist the user with installing and configuring a new device, and adapt instructions specifically for the user based on various sources of data.

At block 506, a hardware feedback communication generated by the smart device can be received. A hardware feedback communication can be a signal resulting from an action performed by the user or the smart device during or after performing the one or more initial instructions. For example, the hardware feedback communication can be communicated by the smart device when a wire of the smart device is connected to a wire of a home in which the smart device is to be installed. As another example, the hardware feedback communication can be communicated by the smart device when a connectivity issue occurs as a result of the smart device attempting to connect to a local network. At block 508, one or more further instructions can be determined for configuring the smart device based on the hardware feedback communication. The further instructions can address an issue associated with the hardware feedback communication, thereby improving the configuration process of the smart device by eliminating issues that might otherwise be exhibited if not addressed during the configuring. At block 510, further instructions for configuring the smart device are provided via the automated assistant interface of the client device.

Figure 6:
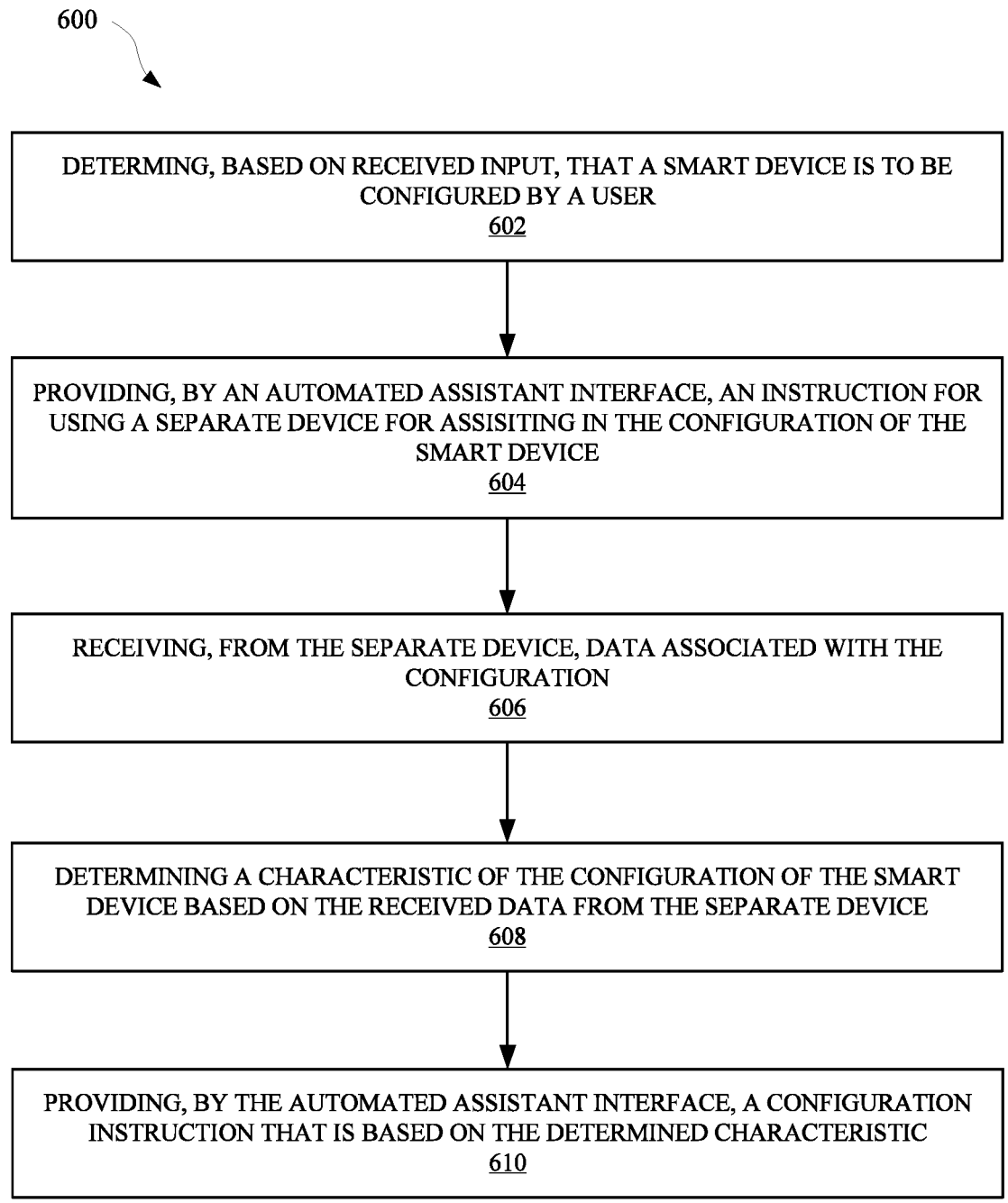
FIG. 6 illustrates a method for adapting instructions for configuring a smart device based on data provided from a separate device during the configuring of the smart device.

FIG. 6 illustrates a method 600 for adapting instructions for configuring a smart device based on sensor data provided from a separate device during the configuring of the smart device. The method 600 can be performed by a client device, a network device, and/or any other computing device capable of providing instructions to a user.

The method 600 can include a block 602 of determining, based on received input, that a smart device is to be configured by a user. The received input can be a signal provided by the smart device over a network such as a local area network or a wide area network. Alternatively, the received input can be from the user providing a verbal or textual input at an automated user interface of a client device. The verbal or textual input can be a query from the user asking an automated assistant application for assistance with setting up their smart device. At block 604, an instruction for using a separate device for assisting in configuration of the smart device can be provided at an automated assistant interface of the client device. The separate device can be a computing device that includes a sensor capable of collecting data related to a characteristic of the smart device or an environment in which the smart device is to be configured. For example, the separate device can be a portable computing device that includes a camera that can capture an image or video of the smart device or the environment.

At block 606, data associated with the configuration can be received from the separate device. The data can be an image of packaging of the smart device, an image of the smart device itself, a network transmission associated with the smart device, and/or any other data that can be associated with a smart device. At block 608, a characteristic of the configuration of the smart device can be determined based on the received data from the separate device. For example, the characteristic of the configuration can be a wiring arrangement of the smart device, a location of the smart device, a network property of the smart device, an output of the smart device, and/or any other feature related to the configuration of the smart device. At block 610, the automated assistant interface can provide a configuration instruction that is based on the determined characteristic of the configuration of the smart device. In this way, the configuration instructions can address any issues that can be identified from data collected by a separate device before, during, or after configuration of the smart device has begun.

Figure 7:
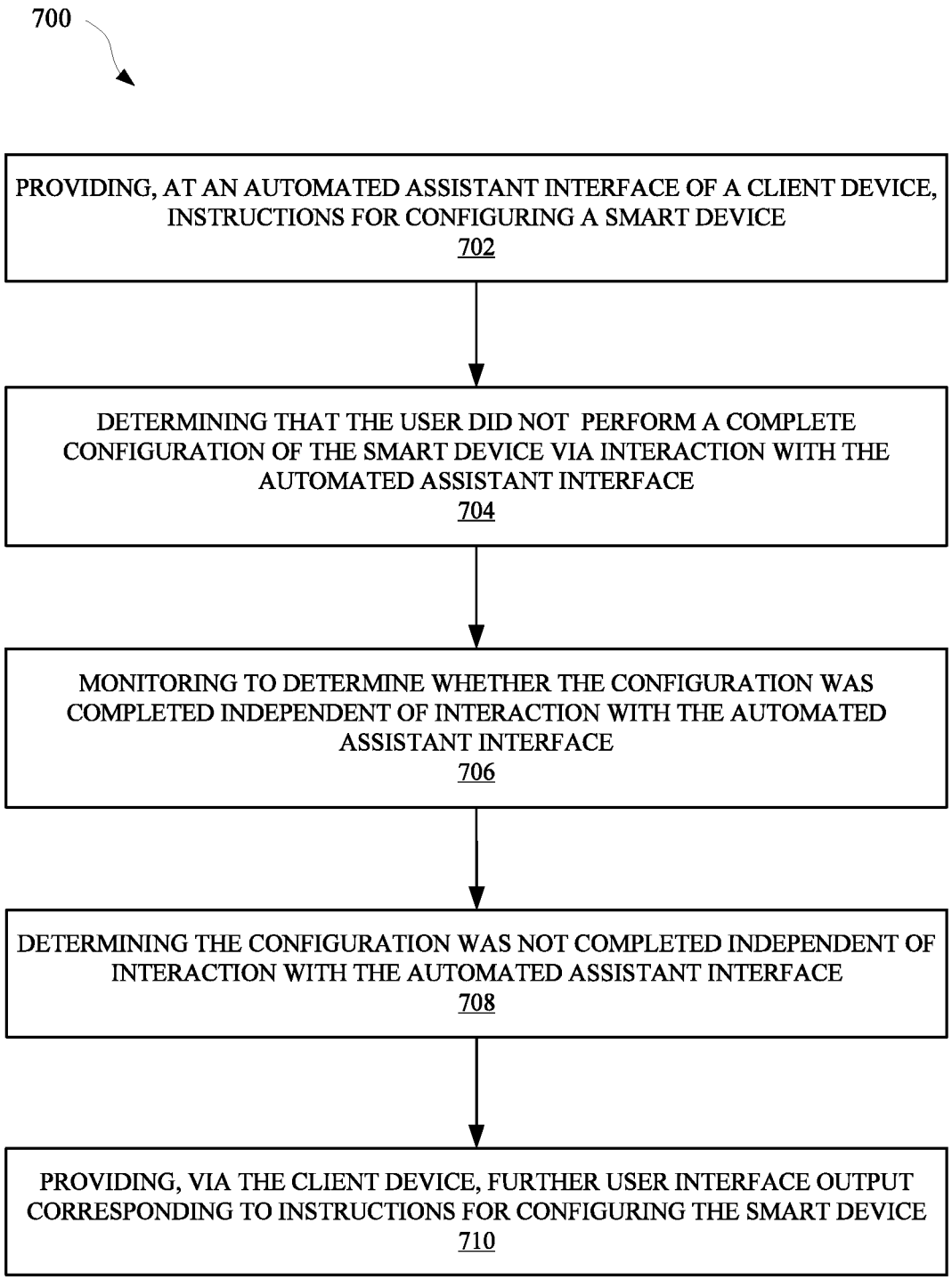
FIG. 7 illustrates a method for adapting instructions for configuring a smart device according to extent to which the configuring was previously completed.

FIG. 7 illustrates a method 700 for adapting instructions for configuring a smart device according to an extent to which the configuring of the smart device was previously completed. The method 700 can be performed by a client device, a network device, and/or any other computing device capable of providing instructions to a user.

The method 700 can include a block 702 of providing, at an automated assistant interface of a client device, instructions for configuring a smart device. The instructions can be through an audio interface, such as a sound system of the client device, or a visual interface of the client device, such as a touch screen. At block 704, it is determined that the user did not perform a complete the configuration of the smart device via interaction with the automated assistant interface. In other words, the user did not receive and/or execute all the instructions from the automated assistant interface for configuring the smart device. In some implementations, the smart device can provide a signal to the automated assistant to indicate the configuration was completed, and the automated assistant can presume the configuration is not complete until the signal is received.

Block 706 includes monitoring to determine whether the configuration was completed independent of the interaction with the automated assistant interface. The monitoring can be performed by detecting signals from the smart device to determine whether the smart device is fully operational despite the user not receiving all the instructions from the automated assistant interface. Alternatively, the monitoring can be performed by detecting a signal from a separate device that stores a status of the smart device. The status can indicate the extent in which the smart device has been configured, such as, for example, a partially operational configuration or a fully operational configuration. Each status can be based on which features of the smart device are operational. In some implementations, the automated assistant can be aware that the configuration was not completed independent of the automated assistant interface when the automated assistant receives a signal from the smart device indicating that there is a configuration issue at the smart device. For example, the user may not have connected the smart device to another device on the network, or failed to set a schedule of operation for the smart device. The smart device can indicate these omissions to the automated assistant so the automated assistant can determine whether the smart device was completely configured. At block 708, it is determined that the configuration was not completed independent of interaction with the automated assistant interface. Based on the determination from block 708, at block 710 further user interface output from the automated assistant interface can be provided from the client device for further configuring the smart device. The further interface output can correspond to instructions for continuing the configuration of the smart device and the further output can be provided in an audio or text format from the client device or a separate device.

Figure 8:
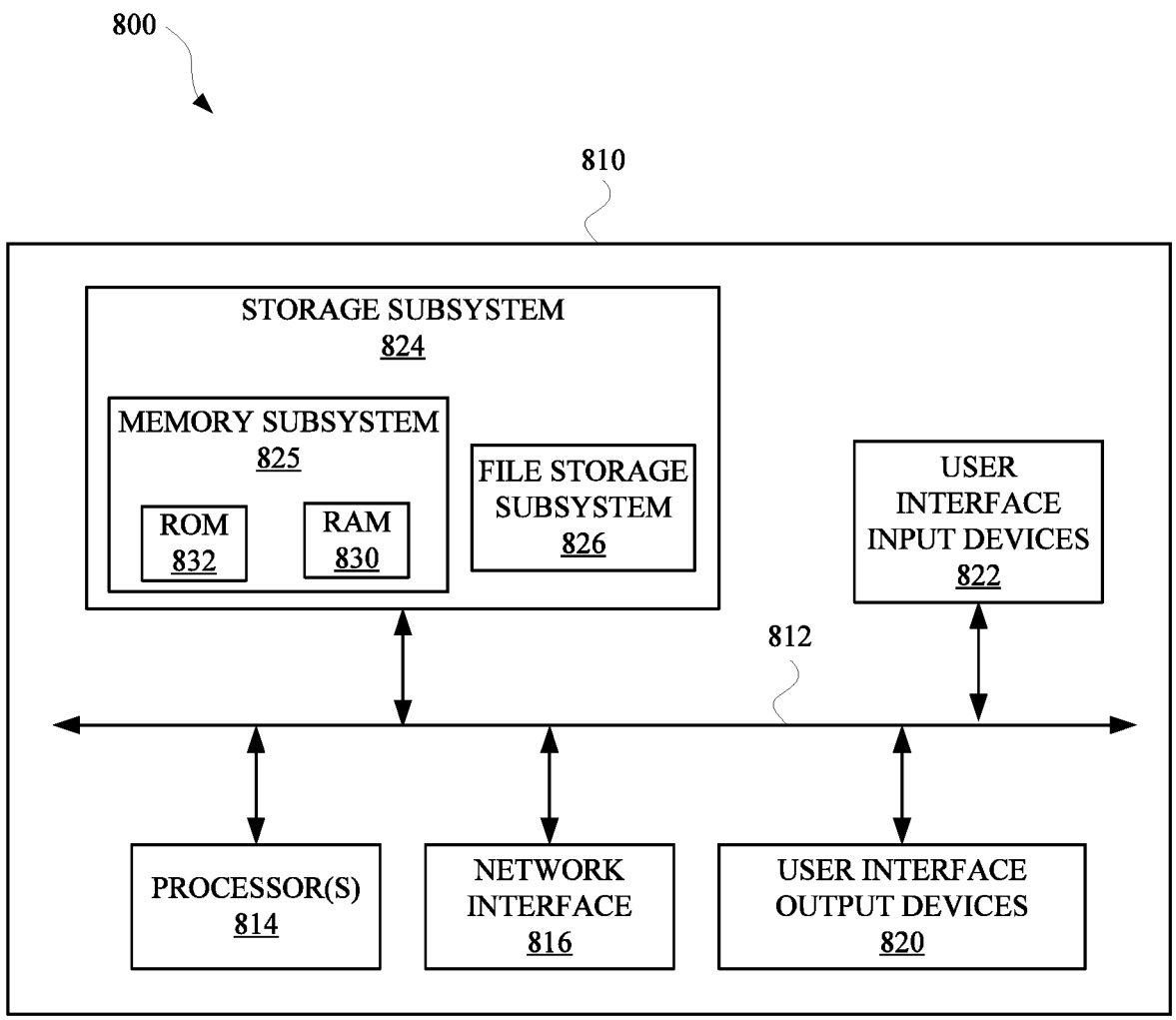
FIG. 8 is a block diagram of an example computer system.

FIG. 8 is a block diagram 800 of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 can include the logic to perform selected aspects of methods 500, 600, 700, and/or to implement one or more of the server devices, client devices, databases, engines, and/or modules described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving, at a client device, a temporary beacon signal, wherein the temporary beacon signal is broadcasted, via a wireless connection, by a smart device to be configured by a user, and wherein the client device is associated with an account of the user;
    determining whether the smart device is associated with the account of the user, wherein determining whether the smart device is associated with the account of the user is based on an indication the user has purchased the smart device;
    in response to determining the smart device is associated with the account of the user:
        transmitting, to the smart device, account data associated with the user, wherein the account data identifies one or more other devices associated with the user as being capable of assisting the user in the installation of the smart device;
        determining one or more instructions for configuring the smart device, based on at least the account data associated with the user, wherein the one or more instructions are tailored based on one or more applications available to one or more of the other devices; and
        causing an automated assistant application to render, at the client device, output that is based on the one or more instructions, for configuring the smart device, that are determined based on at least the account data associated with the user.

2. The method of claim 1, wherein the temporary beacon signal comprises data that identifies the smart device to the automated assistant application.

3. The method of claim 1, wherein the wireless connection is a RFID connection, a wireless internet signal, or a BLUETOOTH signal.

4. The method of claim 3, wherein the wireless connection is a BLUETOOTH Low Energy signal.

5. The method of claim 1, wherein the indication the user has purchased the smart device comprises an email confirming the purchase of the smart device, and wherein determining the smart device is associated with the account of the user comprises:
    identifying the email confirming the purchase of the smart device;
    determining whether the email address of the identified email is associated with the account of the user;
    in response to determining the email address of the identified email is associated with the account of the user:
        identifying the smart device based on the identified email; and
        determining the smart device is associated with the account of the user.

6. The method of claim 1, wherein determining the one or more instructions for configuring the smart device, based on at least the account data associated with the user comprises:
    transmitting, to a remote server, at least the account data associated with the user and client device identification information;
    receiving one or more initial instructions for configuring the smart device, from the remote server; and
    causing the client device to render initial output, at the client device, based on the one or more initial instructions for configuring the smart device.

7. The method of claim 6, further comprising:
    receiving, at the automated assistant application accessible via the client device, an indication the user has performed the one or more initial instructions for configuring the smart device;
    transmitting, to the remote server, at least the indication the user has performed the one or more initial instructions for configuring the smart device;
    receiving one or more additional instructions for configuring the smart device, from the remote server; and
    causing the client device to render additional output, at the client device, based on the one or more additional instructions for configuring the smart device.

8. A non-transitory computer readable storage medium configured to store instructions that, when executed by one or more processors, cause the one or more processors to perform operations that include:
    receiving, at a client device, a temporary beacon signal, wherein the temporary beacon signal is broadcasted, via a wireless connection, by a smart device to be configured by a user, and wherein the client device is associated with an account of the user;
    determining whether the smart device is associated with the account of the user, wherein determining whether the smart device is associated with the account of the user is based on an indication the user has purchased the smart device;
    in response to determining the smart device is associated with the account of the user:
        transmitting, to the smart device, account data associated with the user, wherein the account data identifies one or more other devices associated with the user as being capable of assisting the user in the installation of the smart device;
        determining one or more instructions for configuring the smart device, based on at least the account data associated with the user, wherein the one or more instructions are tailored based on one or more applications available to one or more of the other devices; and causing an automated assistant application to render, at the client device, output that is based on the one or more instructions, for configuring the smart device, that are determined based on at least the account data associated with the user.

9. The non-transitory computer readable storage medium of claim 8, wherein the temporary beacon signal comprises data that identifies the smart device to the automated assistant application.

10. The non-transitory computer readable storage medium of claim 8, wherein the wireless connection is a RFID connection, a wireless internet signal, or a BLUETOOTH signal.

11. The non-transitory computer readable storage medium of claim 10, wherein the wireless connection is a BLUETOOTH Low Energy signal.

12. The non-transitory computer readable storage medium of claim 8, wherein the indication the user has purchased the smart device is an email confirming the purchase of the smart device, and wherein the operation of determining the smart device is associated with the account of the user includes:

identifying the email confirming the purchase of the smart device;

determining whether the email address of the identified email is associated with the account of the user;

in response to determining the email address of the identified email is associated with the account of the user:

identifying the smart device based on the identified email; and determining the smart device is associated with the account of the user.

13. The non-transitory computer readable storage medium of claim 8, wherein the operation of determining the one or more instructions for configuring the smart device, based on at least the account data associated with the user includes:

transmitting, to a remote server, at least the account data associated with the user and client device identification information;

receiving one or more initial instructions for configuring the smart device, from the remote server; and causing the client device to render initial output, at the client device, based on the one or more initial instructions for configuring the smart device.

14. The non-transitory computer readable storage medium of claim 13, wherein the operations further include:

receiving, at the automated assistant application accessible via the client device, an indication the user has performed the one or more initial instructions for configuring the smart device;

transmitting, to the remote server, at least the indication the user has performed the one or more initial instructions for configuring the smart device;

receiving one or more additional instructions for configuring the smart device, from the remote server; and causing the client device to render additional output, at the client device, based on the one or more additional instructions for configuring the smart device.

* * * * *